(12) United States Patent
Reynolds et al.

(10) Patent No.: US 8,193,987 B2
(45) Date of Patent: Jun. 5, 2012

(54) APPARATUS AND METHOD FOR DETERMINING SIGNAL QUALITY IN A GEOLOCATION SYSTEM

(75) Inventors: Tim Reynolds, Palm Bay, FL (US); Shane McLeod, Palm Bay, FL (US); James Russell, Melbourne, FL (US)

(73) Assignee: DRS Soneticom. Inc., West Melbourne, FL (US)

( * ) Notice: Subject to any disclaimer, the term of this patent is extended or adjusted under 35 U.S.C. 154(b) by 359 days.

(21) Appl. No.: 12/547,345

(22) Filed: Aug. 25, 2009

(65) Prior Publication Data

US 2010/0123627 A1 May 20, 2010

Related U.S. Application Data

(60) Provisional application No. 61/091,463, filed on Aug. 25, 2008.

(51) Int. Cl.
*G01S 3/02* (2006.01)

(52) U.S. Cl. ........................................................ 342/465
(58) Field of Classification Search .................. 342/465
See application file for complete search history.

(56) References Cited

U.S. PATENT DOCUMENTS

| | | | |
|---|---|---|---|
| 4,462,048 A * | 7/1984 | Ross ............................ | 386/269 |
| 6,091,362 A * | 7/2000 | Stilp et al. ..................... | 342/465 |
| 6,201,499 B1 * | 3/2001 | Hawkes et al. ............... | 342/387 |
| 6,658,258 B1 * | 12/2003 | Chen et al. .................. | 455/456.1 |
| 2006/0125695 A1 * | 6/2006 | Kennedy et al. .............. | 342/465 |
| 2006/0222058 A1 * | 10/2006 | Simic et al. ................... | 375/150 |
| 2007/0247368 A1 * | 10/2007 | Wu ................................ | 342/465 |
| 2008/0310321 A1 * | 12/2008 | Grilli et al. .................... | 370/252 |
| 2009/0278738 A1 * | 11/2009 | Gopinath ................. | 342/357.12 |
| 2011/0039577 A1 * | 2/2011 | Stern-Berkowitz et al. ........................ | 455/456.1 |

OTHER PUBLICATIONS

Wikipedia Article, "Variance", Aug. 20, 2008 version.*
Wikipedia Article, "Cramer-Rao bound", May 14, 2008 version.*

* cited by examiner

*Primary Examiner* — Thomas Tarcza
*Assistant Examiner* — Frank J McGue
(74) *Attorney, Agent, or Firm* — John L. DeAngelis; Beusse Wolter Sanks Mora & Maire, P.A.

(57) ABSTRACT

In a geolocation system for determining a geolocation of a target emitter, a method for determining the geolocation. The method comprises receiving a signal transmitted from the target emitter at each one of a plurality of sensors; determining whether signals received at n sensors, from among the plurality of sensors, satisfy one or more threshold values related to a condition of the received signals; if signals received at n sensors satisfy the threshold value, commanding m of the n sensors to transmit the signal received thereat or information related to the signal received thereat to a processor; at the processor, determining time difference estimates for the m received signals and determining the geolocation of the target emitter from the time difference estimates.

16 Claims, 2 Drawing Sheets

APPARATUS AND METHOD FOR DETERMINING SIGNAL QUALITY IN A GEOLOCATION SYSTEM

CLAIM OF PRIORITY

This application claims priority under 35 U.S.C. section 119(e) to U.S. Provisional Patent Application assigned application No. 61/091,463, entitled Apparatus and Method for Determining Modulation Quality in a Geolocation System and filed on Aug. 25, 2008, the entire contents of which are hereby incorporated by reference.

FIELD OF THE INVENTION

This invention relates to an apparatus and method for determining modulation quality of a signal, in particular a signal employed to determine a location of an emitter.

BACKGROUND OF THE INVENTION

In a time difference of arrival geolocation system the signal from a target emitter is received at three or more geographically distributed sensors. To determine a location of the emitter, it is necessary to calculate the difference in the arrival time of the same signal at each receiving sensor. These time differences (also referred to as the time difference of arrival or TDOA) correspond to differences in distance between the emitter and the receiving sensors since all signals travel at the speed of light. The distance between the target emitter and each sensor is given by d=ct, where c is the speed of light, t is the transmission time and d is the distance between the target emitter and the receiving sensor.

With the TDOA approach, a signal received at n receiving sites yields n(n−1)/2 pairs of time difference of arrival values from which the location of the emitter can be determined. Generally, the time difference of arrival of the same signal at any two receiving stations (referred to as a pairwise time difference of arrival) is a constant and yields a locus of points along a hyperbola. For example, possible locations of an emitter transmitting a signal arriving at a sensor S1 at t1 and arriving at a sensor S2 at t2 is defined by a locus of points comprising a hyperbolic curve, where the curve is defined by t2−t1=k1, where k1 is a constant.

With only two receiving stations using a TDOA method, it is generally not possible to determine a precise location for a target unit, but rather only a locus of points along a curve. Therefore, TDOA systems generally use at least three receiving stations to make a geolocation determination. For example, if the same signal is also received by a third sensor S3, two additional curves are computed based on the time difference of arrival of the signal at the three sensors taken in pairs. One such curve is determined by the time difference of arrival between sensors S1 and S3, and the other is determined by the time difference of arrival between sensors S2 and S3. The intersection of the three curves is the geolocation of the target emitter.

The target signal necessarily takes different paths to each sensor and may be corrupted by noise and interference as it propagates. Such noise and interference can reduce the accuracy of the target's determined location. Thus determination of the time difference of arrival of the signal at any two sensors is a problem in statistical estimation and therefore the time difference estimate (TDE) is described by both a mean and a variance. The variance of the estimate determines the accuracy of the location solution and is affected by the signal bandwidth, signal to noise ratio and signal duration (the latter referred to as the coherent integration interval).

The present invention relates to determining the signal quality to reduce the variance of the TDE.

DETAILED DESCRIPTION OF INVENTION

Figure 1:
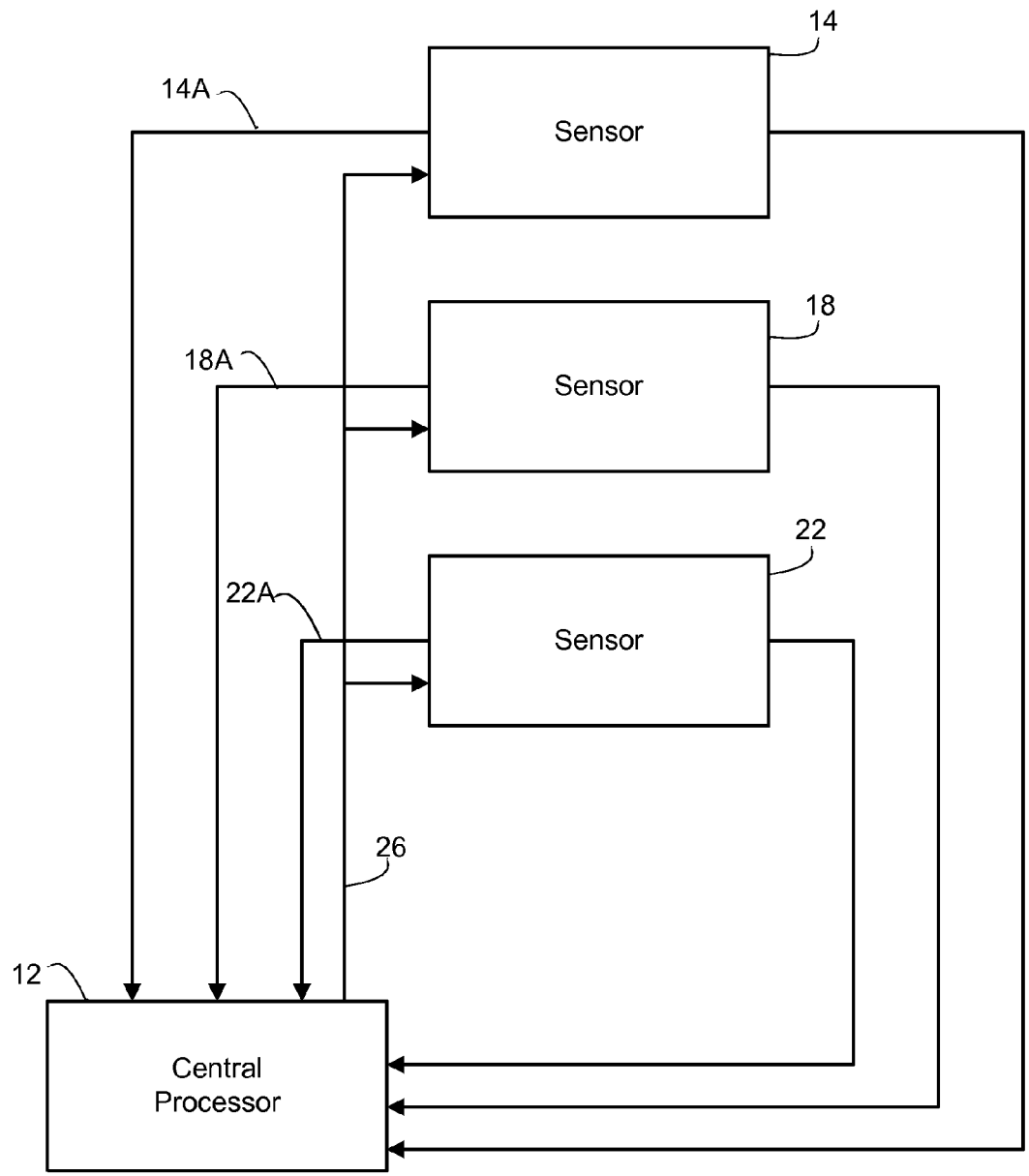
FIG. 1 is a block diagram of an apparatus for determining a signal quality according to the present invention.

Before describing in detail the particular apparatuses and methods for determining modulation quality of a signal, in accordance with the various embodiments of the present invention, it should be observed that these embodiments reside primarily in a novel combination of hardware and software elements related to the claimed apparatuses and methods. Accordingly, the hardware and software elements have been represented by conventional elements in the drawings, showing only those specific details that are pertinent to the presented embodiments, so as not to obscure the disclosure with details that will be readily apparent to those skilled in the art having the benefit of the description herein.

The following embodiments are not intended to define limits as to the structures or methods of the invention but only to provide exemplary constructions. The embodiments are permissive rather than mandatory and illustrative rather than exhaustive.

Known statistical techniques provide an equation that defines how the variance is affected by various signal parameters, including the signal bandwidth, the signal to noise ratio and the signal duration. The equation is referred to as the Cramer-Rao lower bound for the variance of the estimate. This equation states that the variance of the estimate is inversely proportional to the cube of the bandwidth, the square of the joint signal to noise ratio and the coherent integration interval (i.e., the time span of the observed signal). Obviously, the bandwidth of the received signal has the greatest impact on the variance of the time difference estimate and therefore on the accuracy of the geolocation solution.

While digital waveforms such as those employed for WiFi or cellular telephones typically have constant bandwidth, narrow band signals with simple modulation (e.g. FM voice) have a time varying signal bandwidth that is proportional to the amount of information being transmitted. In the FM voice example, the bandwidth increases when the user is speaking but shrinks during intervals of silence. As noted above, the variance of the time difference estimate of the arrival of the signal at two sensors is highly dependent on the bandwidth of the signal; periods of silence tend to increase the variance of the estimate, resulting in a less accurate geolocation solution.

In a conventional geolocation system, signals from the target emitter are received at each sensor and transmitted from the receiving sensor to a central processor (or a TDOA processor) where the TDE between each pair of signals is determined. The geolocation of the emitter is determined from the TDE.

Those portions of the received signal with sufficient bandwidth for the time difference estimate can be determined at the central processor. But this technique requires transferring large amounts of useless signal data from the sensors to the central processor, unnecessarily consuming capacity of the system's communications infrastructure.

The technique of the present invention improves on both of the problems noted above, i.e. the time varying bandwidth of the signal and the transfer of large amounts of useless data to the central processor. The apparatus of the present invention monitors the amplitude and bandwidth of the received signal at each sensor. The central processor requests signal data from a sensor only when a predetermined amplitude threshold and bandwidth threshold is satisfied for that signal or when one of the amplitude and bandwidth thresholds is satisfied. In another embodiment, the system also monitors a signal-to-noise ratio of the sensor signals. According to this embodiment, the central processor requests signal data from a sensor only when one or more of a predetermined amplitude, bandwidth and signal-to-noise ratio threshold is satisfied for that signal.

The inventors have determined that a bandwidth of about 15 kHz, about 0.5 seconds of stare (i.e., time span of the observed signal) and an SNR of about 15 dB provides a reasonable location accuracy.

The system can be further configured by establishing a number of sensor signals that must satisfy the amplitude and bandwidth thresholds before the TDE is determined. For example, the system can be configured to request data from only those sensors receiving a signal that satisfies the amplitude and/or the bandwidth thresholds. Or the system can be configured to request data from all sensors when one signal (or a specified number of sensor signals greater than one) satisfies the amplitude and bandwidth thresholds. Alternatively, for a more accurate geolocation determination, the system can be configured to require that all sensor signals satisfy the amplitude and bandwidth thresholds before the TDE is determined using any number of the sensor signals. As another alternative, the amplitude and bandwidth thresholds and the number of sensor signals required to satisfy the thresholds may be established to yield a desired variance in the time difference estimate.

For example, to minimize the variance in the time difference estimate it may be necessary to require that all sensor signals satisfy the amplitude and bandwidth thresholds. This technique reduces the stress on the system's communications infrastructure by transferring only data that will meaningfully contribute to the geolocation processing. The technique also improves the accuracy of the geolocation solutions by providing only signal data with adequate bandwidth and amplitude for meaningful geolocation processing.

In one application, the central processor monitors the amplitude and bandwidth of the signals being received at each of the sensors through the receipt of small packets of time-stamped signal data from each sensor (about 10 packets per second in one embodiment). The central processor performs fast Fourier transform (FFT) processing on each packet and requests additional time synchronized data from each sensor when the FFT meets or exceeds the amplitude and bandwidth thresholds set by a user.

This technique reduces the load on the communications infrastructure while providing more meaningful data to the geolocation algorithms, resulting in more accurate and faster location solutions.

FIG. 1 illustrates a central processor (or TDOA processor) 12 receiving signals from a plurality of sensors (three sensors illustrated) 14, 18 and 22 over communication links 14A, 18A and 22A. The sensors 14, 18 and 22 receive the same signal from a target emitter for determining a position of the emitter. In one embodiment, data packets are sent from each sensor 14, 18 and 22 to the central processor 12. After analyzing the data packets as described above, the central processor 12 transmits control signals to one or more of the sensors 14, 18 and 22 over a control link 26. The control signals command one or more of the sensors to send additional data related to the sent packets.

Figure 2:
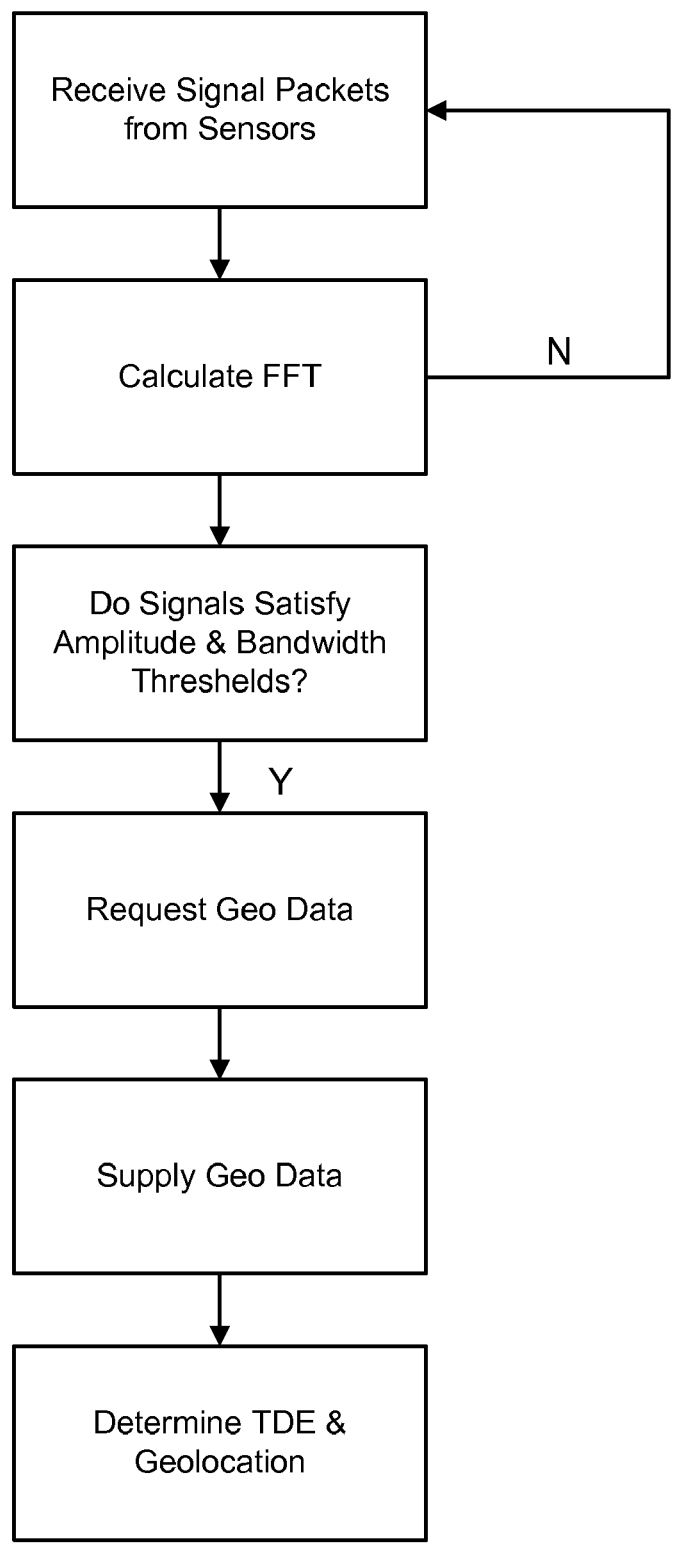
FIG. 2 is a flow diagram of signal processing steps according to the present invention.

FIG. 2 is a flow diagram of the signal processing steps and data flow according to the present invention. At a step 50 periodic signal data packets are supplied to the central processor (in one embodiment about 10 packets per second). The processor determines the FFT at a step 54 and the results compared to user-determined amplitude and bandwidth thresholds at a step 58. If one or both thresholds are satisfied by the signal at a selected number of the sensors, then at a step 62 the central processor requests time-stamped signal time of arrival information (also referred to as geo-data). In one embodiment, the time-stamp comprises one pulse per second from a GPS satellite. The number of sensors supplying the signal time of arrival information may comprise all sensors, all sensors receiving a signal that satisfies one or both thresholds, or a subset of either category.

At a step 66 the time of arrival information is supplied to the central processor and at a step 70 the TDE and geolocation is determined.

Returning to the step 58, if the signal packets do not satisfy one or both of the thresholds (as determined by the user), processing returns to the step 50 to collect additional signals and generate signal packets responsive thereto.

Any frequency components of the two signals (i.e., the two signals that are used to determine a pairwise time difference estimate) used in the time difference estimate (TDE) algorithm that are below a user-selected or determined threshold are set to zero. This effectively sets the noise level at those frequencies to zero, and thus the total signal to noise level in the two signals increases.

Any one or more of the above method steps may also be incorporated into a computer-based system including a processor and a memory comprising computer-readable instructions that, when executed by the processor, cause a computer to perform any one or more of the method steps set forth herein.

While the invention has been described with reference to various embodiments, it will be understood by those skilled in the art that various changes may be made and equivalent elements and process steps may be substituted for elements thereof without departing from the scope of the present invention. The scope of the present invention further includes any combination of the elements and process steps from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. In a geolocation system for determining a geolocation of a target emitter, a method for determining the geolocation comprising:

receiving a signal transmitted from the target emitter at each one of a plurality of sensors;

determining whether signals received at n sensors, from among the plurality of sensors, have a signal parameter that satisfies an associated threshold values, wherein the signal parameter comprises one or more of a signal amplitude, a signal bandwidth, a signal-to-noise ratio and a stare period, the associated threshold value selected to minimize a lower bound of a variance estimate according to a Cramer Rao equation;

if signals received at n sensors satisfy the threshold value, commanding m of the n sensors to transmit one or both of the signal received thereat or information related to the signal received thereat to a processor;

at the processor, determining time difference estimates for the m received signals; and determining the geolocation of the target emitter from the time difference estimates.

2. The method of claim 1 wherein the geolocation system comprises one of a direction-finding system, a time difference of arrival system, an angle of arrival system and a frequency difference of arrival system.

3. The method of claim 1 wherein the step of determining time difference estimates further comprises determining pairwise time difference estimates using the m received signals.

4. The method of claim 1 wherein the step of determining time difference estimates further comprises:

determining a signal magnitude over a frequency range for each of the m received signals;

determining signal magnitudes that are below a magnitude threshold and determining a frequency or a frequency interval associated with any signal magnitudes below the threshold;

setting a value of determined signal magnitudes to zero or near zero to create a modified signal; and determining pairwise time difference estimates using the modified signals.

5. The method of claim 1 wherein the step of receiving further comprises time-stamping the signal received at each one of the plurality of sensors.

6. The method of claim 1 wherein a value of n is determined to achieve a predetermined variance for the time difference estimate.

7. The method of claim 1 wherein a value of n is determined responsive to a lower bound for a variance of the time difference estimate based on a Cramer-Rao equation.

8. The method of claim 1 wherein a value of n equals three.

9. The method of claim 1 wherein n sensors comprise all of the plurality of sensors.

10. The method of claim 1 wherein the m sensors comprise the n sensors receiving a signal that satisfies the one or more threshold values.

11. The method of claim 1 wherein the m sensors comprise all of the plurality of sensors.

12. The method of claim 1 wherein the signal bandwidth comprises 15 kHz, the stare interval comprises 0.5 seconds and the signal-to-noise ratio comprises 15 dB.

13. The method of claim 1 further comprising affixing a time stamp to the signal received at each one of the plurality of sensors and including the time stamp in the information related to the signal received at the sensor to the processor.

14. In a geolocation system for determining a geolocation of a target emitter, a method for determining the geolocation comprising:

receiving a signal transmitted from the target emitter at each one of a plurality of sensors;

determining whether signals received at n sensors, from among the plurality of sensors, satisfy one or more threshold values related to a condition of the received signals;

if signals received at n sensors satisfy the threshold value, commanding m of the n sensors to transmit one or both of the signal received thereat or information related to the signal received thereat to a processor;

at the processor, determining time difference estimates for the m received signals;

determining the geolocation of the target emitter from the time difference estimates; and wherein the step of determining whether n of the received signals satisfy one or more threshold values further comprises, transmitting data packets from each of the plurality of sensors to the processor, each data packet representing one of the received signals;

at the processor receiving the data packets and determining a Fourier transform of each data packet; and if the Fourier transform indicates that n of the received signals satisfy one or more threshold values related to the condition of the received signal, then commanding m of the n sensors to transmit the signal received thereat or information related to the signal received thereat to the processor.

15. The method of claim 14 wherein the step of transmitting data packets executes periodically.

16. The method of claim 14 wherein the step of transmitting data packets further comprises transmitting about 10 packets per second.

* * * * *